US007051168B2

(12) United States Patent
Gschwind et al.

(10) Patent No.: US 7,051,168 B2
(45) Date of Patent: May 23, 2006

(54) METHOD AND APPARATUS FOR ALIGNING MEMORY WRITE DATA IN A MICROPROCESSOR

(75) Inventors: Michael K. Gschwind, Yorktown, NY (US); Martin E. Hopkins, Chappaqua, NY (US); H. Peter Hofstee, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 519 days.

(21) Appl. No.: 09/940,911

(22) Filed: Aug. 28, 2001

(65) Prior Publication Data

US 2003/0056064 A1    Mar. 20, 2003

(51) Int. Cl.
*G06F 12/00* (2006.01)
(52) U.S. Cl. .................. 711/154; 711/155; 712/204; 712/300
(58) Field of Classification Search ............... 711/154, 711/155, 171, 201; 712/204, 300
See application file for complete search history.

(56) References Cited

U.S. PATENT DOCUMENTS

| 4,396,982 | A | * | 8/1983 | Wada et al. ................ 712/204 |
| 4,569,016 | A | * | 2/1986 | Hao et al. ................... 712/224 |
| 4,814,976 | A | | 3/1989 | Hansen et al. |
| 5,386,531 | A | * | 1/1995 | Blaner et al. ............... 711/201 |
| 5,410,682 | A | * | 4/1995 | Sites et al. ................. 712/300 |
| 5,471,628 | A | * | 11/1995 | Phillips et al. .............. 712/223 |
| 5,938,756 | A | * | 8/1999 | Van Hook et al. ............ 712/23 |
| 6,167,509 | A | * | 12/2000 | Sites et al. .................. 712/237 |
| 6,173,393 | B1 | * | 1/2001 | Palanca et al. ............. 712/224 |
| 6,820,195 | B1 | * | 11/2004 | Shepherd .................... 712/300 |

OTHER PUBLICATIONS

John L. Hennessy, "VLSI Processor Architecture," Dec. 1984, IEEE Transactions On Computers, vol. C-33, No. 12, pp. 1221-1246.
Richard L. Sites, "Alpha AXP Architecture," Feb. 1993, Communications of the ACM, vol. 36., No. 2, pp. 33-44.
Patent Application entitled "Processor Implementation having Unified Scalar and SIMD Datapath," filed on Aug. 14, 2001.

* cited by examiner

*Primary Examiner*—B. James Peikari
*Assistant Examiner*—Woo H. Choi
(74) *Attorney, Agent, or Firm*—F. Chau & Associates, LLC (57) ABSTRACT

There is provided a method for aligning and inserting data elements into a memory based upon an instruction sequence consisting of one or more alignment instructions and a single store instruction. Given a data item that includes a data element to be stored, the method includes the step of aligning the data element in another memory with respect to a predetermined position in the memory, in response to the one or more alignment instructions. A mask is dynamically generated to enable writing of memory bit lines that correspond to the aligned data element. The memory bit lines are written to the memory under a control of the mask. The generating and writing steps are performed in response to the single store instruction.

22 Claims, 8 Drawing Sheets

| | | |
|---|---|---|
| subfi r3, r5, 3 ; | compute rotate count | r3 = 3 - r5 |
| rotbl r2, r4, r3 | ; rotate bytes left | r2 = r4 ROTL (r3 * 8) |
| stb r2, 0(r5) | ; store byte | mem[r5] = r2 using a 1-byte mask aligned with address 0(r5) |

| | | |
|---|---|---|
| subfi r3, r5, 12 | ; compute rotate count | r3 = 12 - r5 |
| vrotbl r2, r4, r3 | ; rotate bytes left | r2 = r4 ROTL (r3 * 8) |
| vstw r2, 0(r5) | ; store word | mem[r5] = r2 using a 1-word (4-byte) mask aligned with address 0(r5) |

METHOD AND APPARATUS FOR ALIGNING MEMORY WRITE DATA IN A MICROPROCESSOR

BACKGROUND OF THE INVENTION

1. Technical Field

The present invention relates generally to microprocessors and, in particular, to a method and apparatus for aligning memory write data in a microprocessor.

2. Description of Related Art

Contemporary microprocessors usually support the processing of data of multiple bit widths. In such microprocessors, one or more data types are preferred in that they are supported by appropriately-sized hardware primitives, such as registers, arithmetic logic units (ALUs), and memory queues.

Other data types are supported to a limited degree, in that such data can be read from and written to their natural alignment boundaries. During a read process, this usually requires realigning into processor registers and processor data paths such that a single data item which is not of full width is naturally aligned at the least significant position, optionally with zero or sign extension. Likewise, a sub-width data type when written to an address of its natural alignment boundary needs to be realigned within a processor to that boundary.

Also, it should be noted that data is organized in modern computers in one of two formats or in some combination of two formats. The formats are known as "big-endian", in which the high order bit, byte or other units of information is located in the lower numbered unit address, and "little-endian", in which the high order bit, byte or other units of information is located in the higher numbered unit address.

To date, microprocessors have usually included a rotator/alignment network prior to the memory interface for writing data, and beyond the memory stage for the read operation. This is undesirable for at least the following reasons. One such reason concerns data flow considerations. That is, if the standard rotator is to be used, then the data flow from the rotator to the memory interface is complex and can be slow. In particular, the rotator is aligned at ALU track pitch which differs from memory track pitch. Therefor, it is often necessary to introduce a second and possibly third rotator, before (for writing) and after (for reading) the memory access. This requires additional hardware, and also increases latency of memory operations, including those which do not need alignment operations (usually data in one of the preferred data formats corresponding to a natural machine processing width), since bypassing the rotators is often not practical.

Attempts have been made to reduce the complexity and resultant latency of memory access in the MIPS-X processor prototype from Stanford University, and the initial Alpha processor specification by Digital Equipment Corporation.

The Stanford MIPS processor is described by J. Hennessy, in "VLSI Processor Architecture", IEEE Transactions on Computers, Vol. C-33, No. 12, pp. 1221–46, December 1984. This processor uses byte insert (IC) and extract (XC) operations to manipulate bytes, but otherwise only supports word addressing.

The approach used in these processors was to support only preferred data width memory operations, in conjunction with explicit memory alignment operations. Both of these architecture specifications have only had limited success with this approach, prompting the addition of sub-word memory operations to later generations of the processors.

The usual alignment networks are endian-specific and adding endian-independence usually requires additional logic in the alignment network. Processor implementors can either decide to support both big-endian and little-endian modes at the cost of high complexity, or only support one mode at the cost of sacrificing compatibility with a significant number of processors not having the selected endianness.

Explicit software-based alignment does not suffer from this defect, as both little-endian and big-endian configurations can be supported by the appropriate software sequences.

Accordingly, it would be desirable and highly advantageous to have a method and apparatus that supports software-based alignment of memory accesses, so as to reduce microprocessor implementation complexity, support big-endian and little-endian configurations, and reduce the penalty for using software based alignment of memory-write data found in previous processors.

SUMMARY OF THE INVENTION

The problems stated above, as well as other related problems of the prior art, are solved by the present invention, a method and apparatus for aligning memory write data in a microprocessor.

The present invention advantageously reduces microprocessor implementation complexity, supports big-endian and little-endian configurations, and reduces the penalty for using software based alignment of memory-write data found in previous processors.

According to an aspect of the present invention, there is provided a method for aligning and inserting data elements into a memory based upon an instruction sequence consisting of one or more alignment instructions and a single store instruction. Given a data item that includes a data element to be stored, the method includes the step of aligning the data element in another memory with respect to a predetermined position in the memory, in response to the one or more alignment instructions. A mask is dynamically generated to enable writing of memory bit lines that correspond to the aligned data element. The memory bit lines are written to the memory under a control of the mask. The generating and writing steps are performed in response to the single store instruction.

According to another aspect of the present invention, there is provided a system for aligning and inserting data elements into a memory in response to an instruction sequence consisting of one or more alignment instructions and a single store instruction. The system includes means for receiving a data item that includes a data element to be stored. Further, the system includes means for aligning the data element in another memory with respect to a predetermined position in the memory, in response to the one or more alignment instructions. Also, the system includes means for dynamically generating a mask to enable writing of memory bit lines that correspond to the aligned data element, in response to the single store instruction. Moreover, the system includes means for writing the memory bit lines to the memory under a control of the mask, in response to the single store instruction.

According to yet another aspect of the present invention, there is provided a method for storing data in a memory based upon an instruction sequence consisting of one or more alignment instructions and a single store instruction. The method includes the step of aligning the data in a register relative to a location of the data within a target memory address line, in response to the one or more alignment instructions. A portion of the aligned data is stored within the memory under a control of data type information and an address argument specified by the single store instruction, in response to the single store instruction.

According to still yet another aspect of the present invention, there is provided, in a memory system with a register and a memory and without an alignment network, a method for storing data in the memory based upon a single store instruction. The method includes the step of generating memory write instructions for directly storing a plurality of bits from the register to a memory line in the memory under a control of a mask, a bit range of the plurality of bits being specified by parameters of the single store instruction.

These and other aspects, features and advantages of the present invention will become apparent from the following detailed description of preferred embodiments, which is to be read in connection with the accompanying drawings.

DETAILED DESCRIPTION OF PREFERRED EMBODIMENTS

It is to be understood that the present invention may be implemented in various forms of hardware, software, firmware, special purpose processors, or a combination thereof.

Preferably, the present invention is implemented as a combination of both hardware and software, the software being an application program tangibly embodied on a program storage device. The application program may be uploaded to, and executed by, a machine comprising any suitable architecture. Preferably, the machine is implemented on a computer platform having hardware such as one or more central processing units (CPU), a random access memory (RAM), and input/output (I/O) interface(s). The computer platform also includes an operating system and microinstruction code. The various processes and functions described herein may either be part of the microinstruction code or part of the application program (or a combination thereof) which is executed via the operating system. In addition, various other peripheral devices may be connected to the computer platform such as an additional data storage device.

It is to be further understood that, because some of the constituent system components depicted in the accompanying Figures may be implemented in software, the actual connections between the system components may differ depending upon the manner in which the present invention is programmed. Given the teachings herein, one of ordinary skill in the related art will be able to contemplate these and similar implementations or configurations of the present invention.

Figure 1:
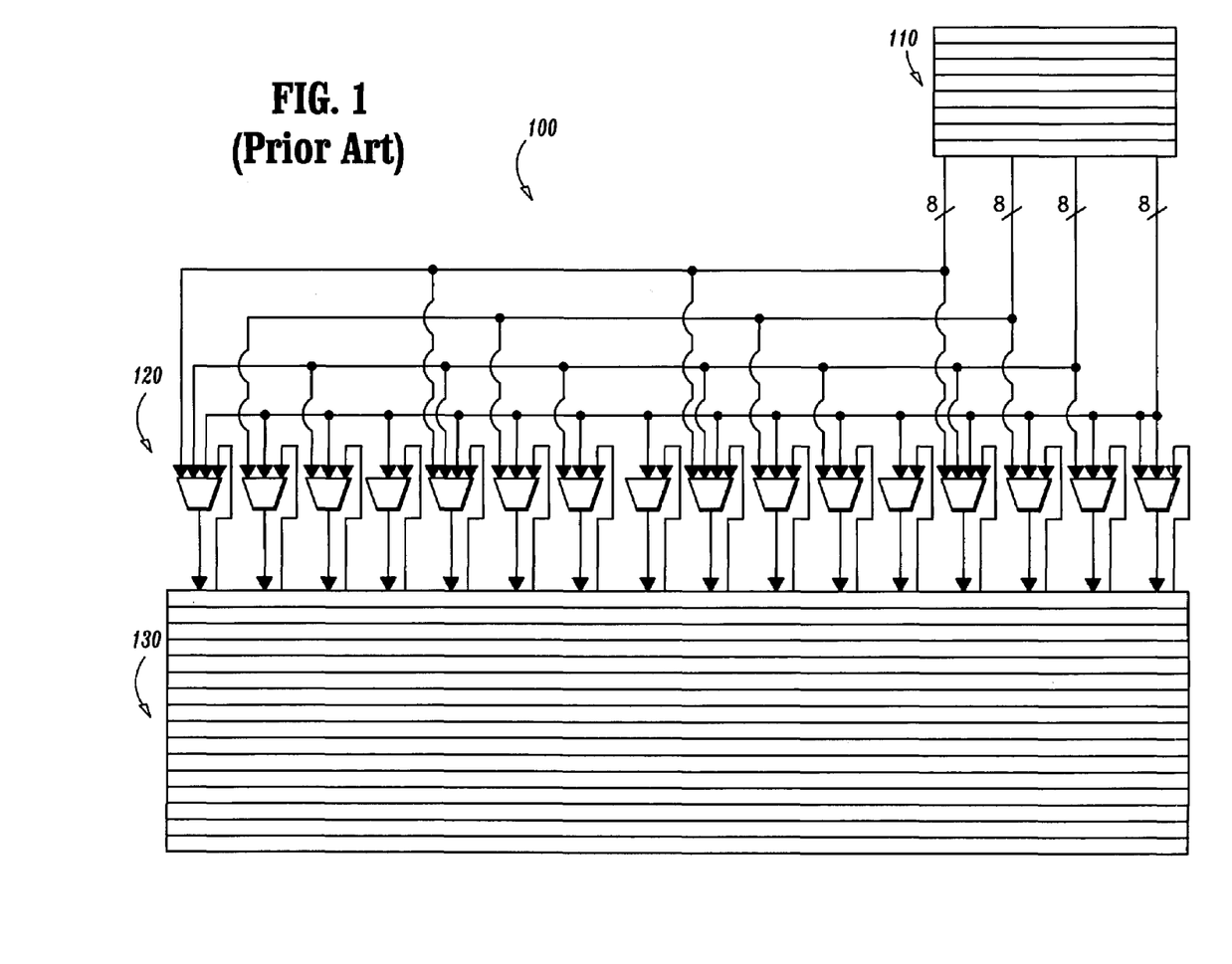
FIG. 1 is a block diagram illustrating a memory write data path used in a processor supporting byte, half-word, and word memory write operations, according to the prior art.

FIG. 1 is a block diagram illustrating the memory write data path 100 used in a processor supporting byte, half-word, and word memory write operations, according to the prior art. The memory write path 100 includes a register file 110, multiplexers 120, and a cache memory 130. It is to be appreciated that while a cache is shown in the FIGS. herein, main memory (not shown) may be used in place of the cache; furthermore, such main memory may be augmented by the cache.

Processors supporting byte, half-word and word memory write operations employ an alignment network which steers the byte, half-word, word, or other unit, to its appropriate location within a memory line. In FIG. 1, the memory line has been designated as a cache line, since most computer systems employ wide caches. However, as is readily apparent to one of ordinary skill in the related art, other memory structures could interface to the alignment network. Moreover, as is known to those of ordinary skill in the related art, a computer system can also include other logic, such as a read/write buffer, Error Correcting Code (ECC) or parity checking, and generation logic. As is evident from FIG. 1, using such an alignment network requires the use of multiplexers 120 to select the data source to be written to the cache memory 130 depending on control signals generated based on the memory address and data type, resulting in increased chip size and signal delay. Furthermore, the multitude of signals supplied to the multiplexers 120 requires chip area to connect the signals which also increases signal delay.

Figure 2:
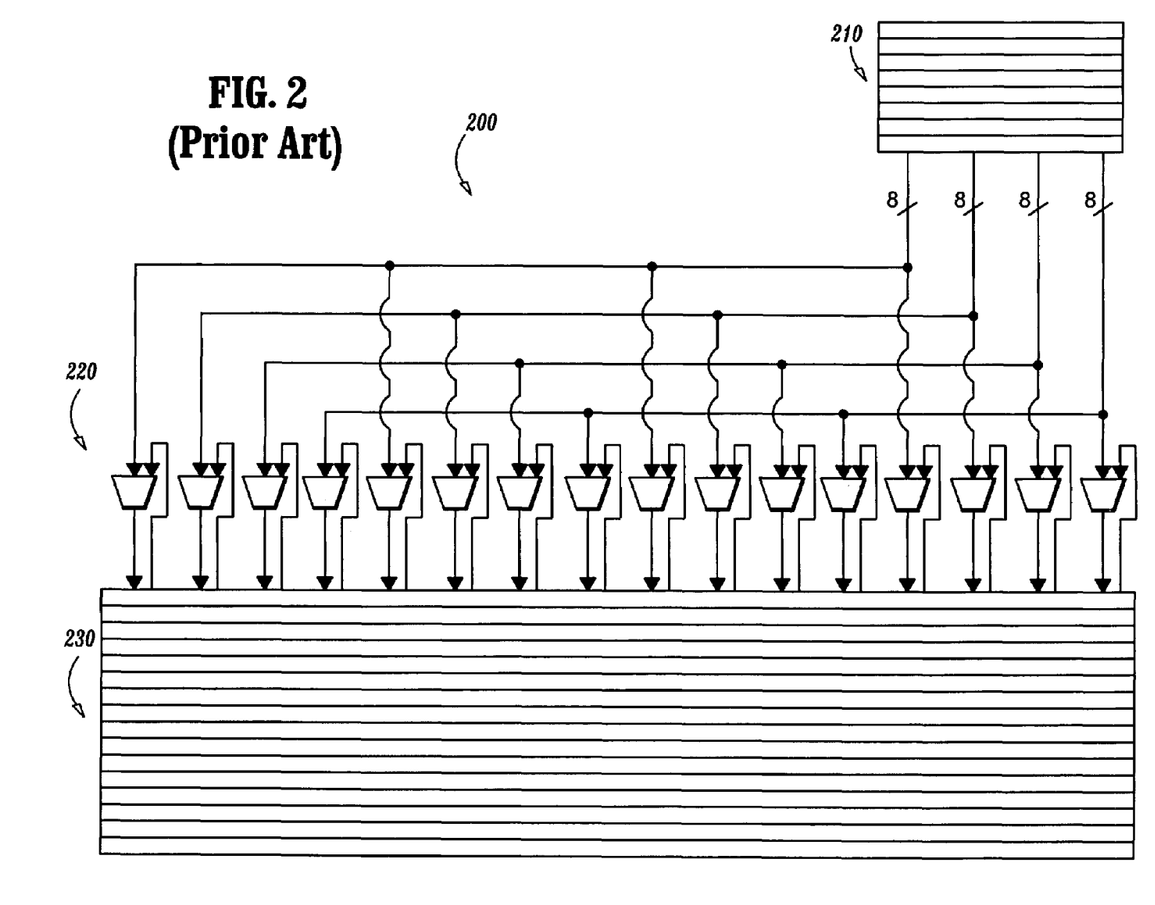
FIG. 2 is a block diagram illustrating the memory write data path used in a processor without support for subword alignment, according to the prior art.

FIG. 2 is a block diagram illustrating the memory write data path 200 used in a processor without support for subword alignment, according to the prior art. The memory write data path 200 includes a register file 210, multiplexers 220, and a cache memory 230. As can be seen, each byte of the register file 210 is connected only to a memory location corresponding to a natural alignment. Thus, the first byte of the register file 210 can be supplied to a first, fifth, ninth, thirteenth byte of a memory line, the second byte to the second, sixth, tenth, fourteenth byte of a memory line, and so forth. It should be noted that this leads to a simpler connection network and to reduced width multiplexers selecting only between the previous memory content and the newly supplied content. Furthermore, the functionality of the multiplexers 220 can also be achieved with the use of write-enable control signals to memory banks, thereby completely eliminating the needs for multiplexers and further reducing the complexity of the alignment network.

In FIG. 2, the memory line has been designated as a cache line, since most computer systems employ wide caches. However, as is readily apparent to one of ordinary skill in the related art, other memory structures could interface to the alignment network. Moreover, as is known to those of ordinary skill in the related art, a computer system can also include other logic, such as a read/write buffer, Error Correcting Code (ECC) or parity checking, and generation logic.

Figure 3:
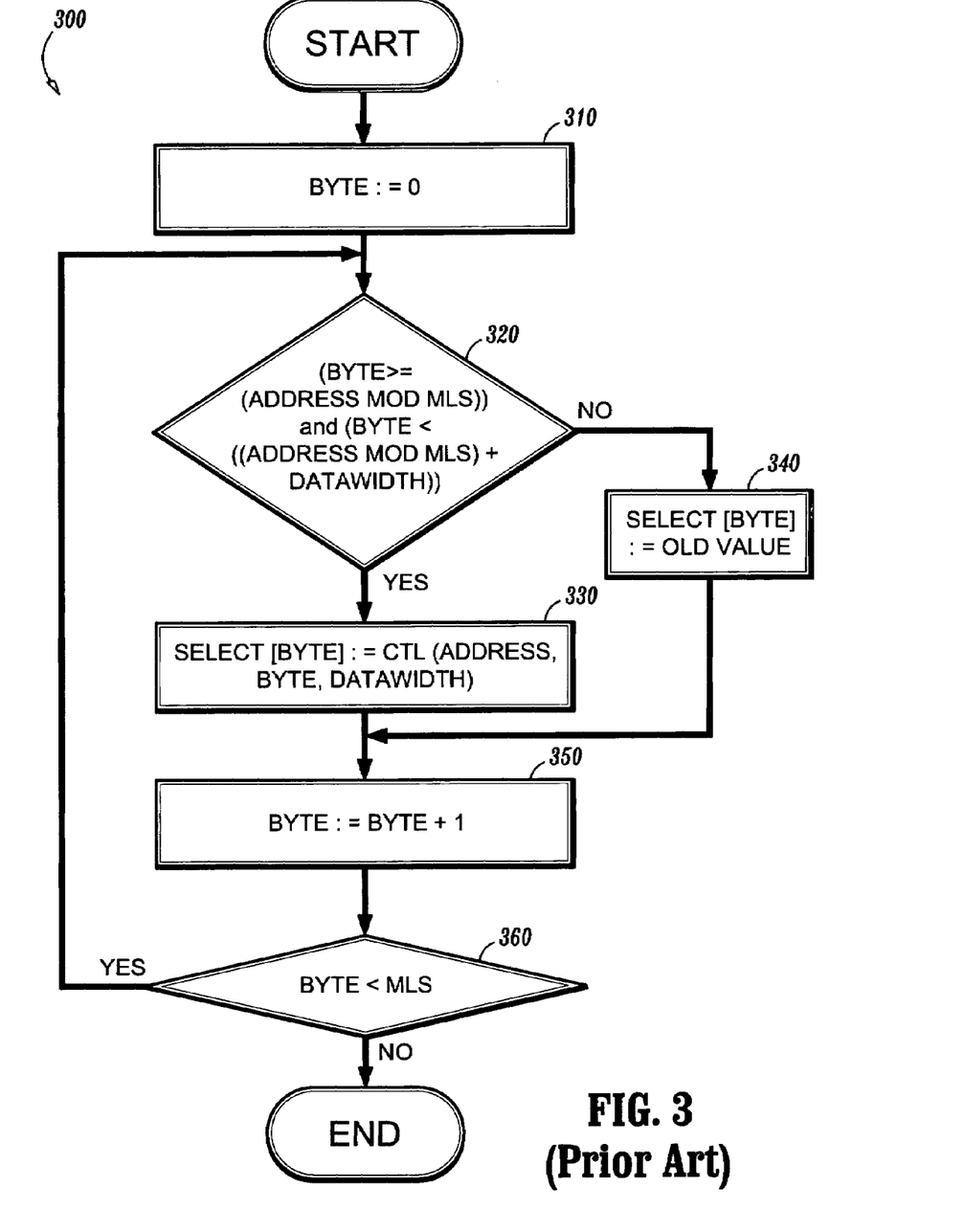
FIG. 3 is a flow diagram illustrating the control logic used in conjunction with the memory write path of FIG. 1, according to prior art.

FIG. 3 is a flow diagram illustrating the alignment network control logic 300 used in conjunction with the memory write path 100 of FIG. 1, according to prior art. In particular, this control logic computes output SELECT[BYTE] which selects how the multiplexers 120 select the output data from their input data for the respective bytes. As is apparent to those of ordinary skill in the related art, other control logic may also be present in the memory data path, e.g., cache hit/miss logic. The alignment network control logic 300 is expressed as a sequential loop to express the functionality of the alignment network control logic 300, although it is apparent to those of ordinary skill in the related art that actual implementations are usually performed using parallel control logic. In particular, when a store instruction is processed by the processor, the alignment network control logic 300 performs a loop for every byte of the memory line size (MLS), beginning with byte 0 (initialized in step 310) until the end of the memory line size (loop counter increment is performed in step 350 and loop iteration test in step 360).

In step 320, it is determined whether the current byte within a memory line (a) corresponds to the alignment specified by the store address and (b) falls within the data size range specified by the data width. If not (negative determination at step 320), then processing proceeds to step 340. Otherwise, processing continues with step 330.

In step 330, the control signal for the current byte is computed as the control signal corresponding to the byte of the register file to be written to the current location according to the address and data width specified, and processing proceeds to step 350.

In step 340, the multiplexer is configured to maintain the previous value in the memory location, and processing proceeds to step 350.

The loop counter is incremented in step 350, and it is determined whether the current byte is less than the MLS (step 360). If so, then processing returns to step 320 to perform the next iteration. The loop iterates until control signals for the entire memory line have been generated. Thus, for a negative determination at step 360, the processing is terminated.

Figure 4:
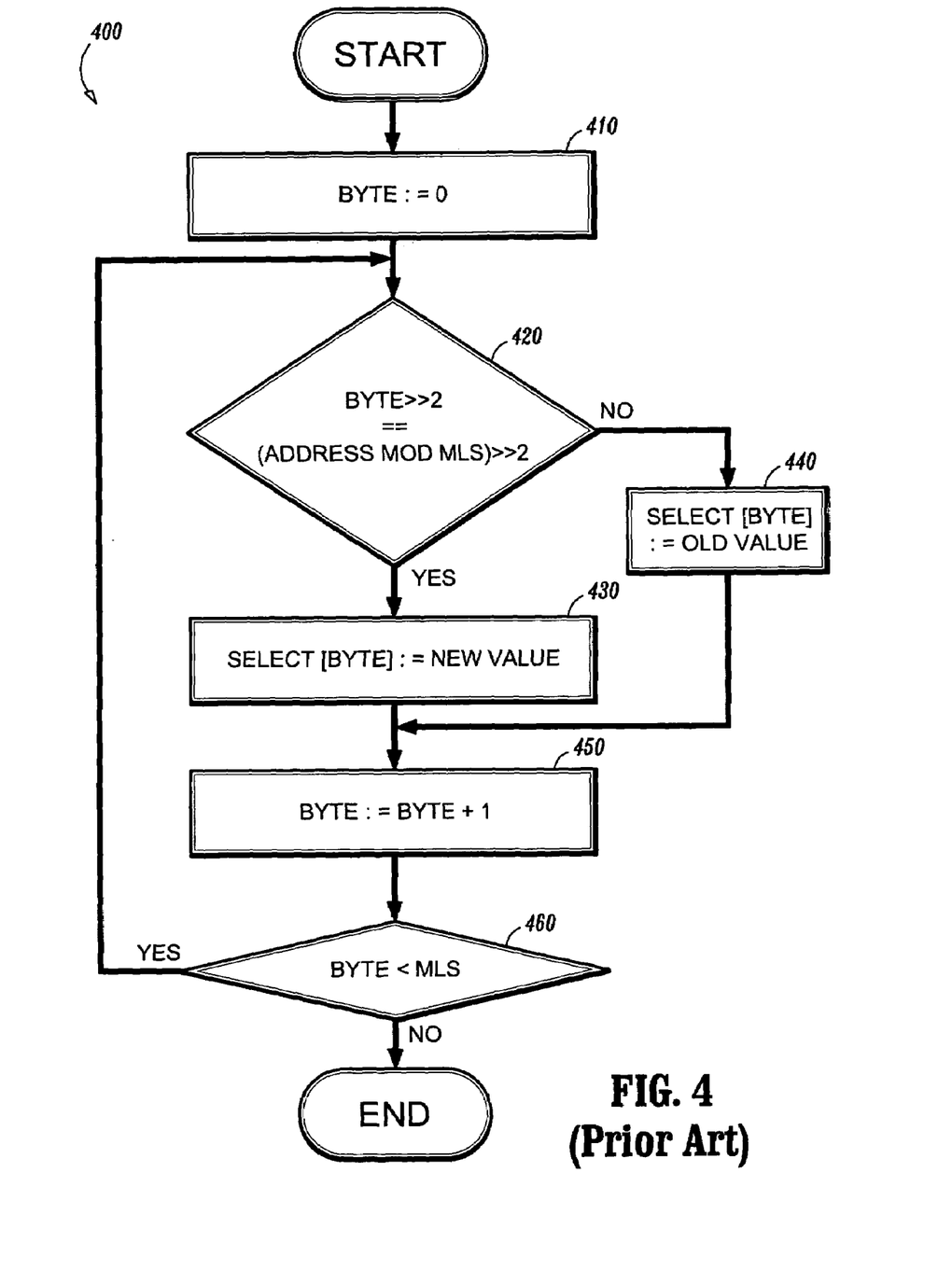
FIG. 4 is a flow diagram illustrating the control logic used in conjunction with FIG. 2 in the Stanford MIPS and DEC Alpha processors, according to the prior art.

FIG. 4 is a flow diagram illustrating the alignment network control logic 400 used in conjunction with the memory write data path 200 of FIG. 2 in the Stanford MIPS and, in principle, DEC Alpha processors, according to the prior art. In particular, the alignment network control logic 400 is used to control multiplexers 220. As is apparent to those of ordinary skill in the related art, other control logic may also be present in the memory data path, e.g., cache hit/miss logic. The alignment network control logic 400 is expressed as a sequential loop to express the functionality of the alignment network control logic 400, although it is apparent to those of ordinary skill in the related art that actual implementations are usually performed using parallel control logic. In particular, when a store instruction is processed by the processor, the alignment network control logic 400 performs a loop for every byte of the memory line size (MLS), beginning with byte 0 (initialized in step 410) until the end of the memory line size (loop counter increment is performed in step 450 and loop iteration test in step 460).

In step 420, it is determined whether the current byte within a memory line is part of the memory word to be written at the specified store address. Since the Stanford MIPS only supports word write operations, the alignment network control logic 400 is significantly simplified. In particular, the alignment network control logic 400 can be implemented by comparing a subset of the address lines with a predefined constant. If the determination performed at step 420 returns a negative response, then processing proceeds to step 440. Otherwise, processing continues with step 430.

In step 430, the control signal for the current byte is selected such that the value provided by the memory write data path will be selected, and processing proceeds to step 450.

In step 440, the multiplexer is configured to maintain the previous value in the memory location, and processing proceeds to step 450.

The loop counter is incremented in step 450, and it is determined whether the current byte is less than the MLS (step 460). If so, then processing returns to step 420 to perform the next iteration. The loop iterates until control signals for the entire memory line have been generated. Thus, for a negative determination at step 460, the processing is terminated.

Figure 5:
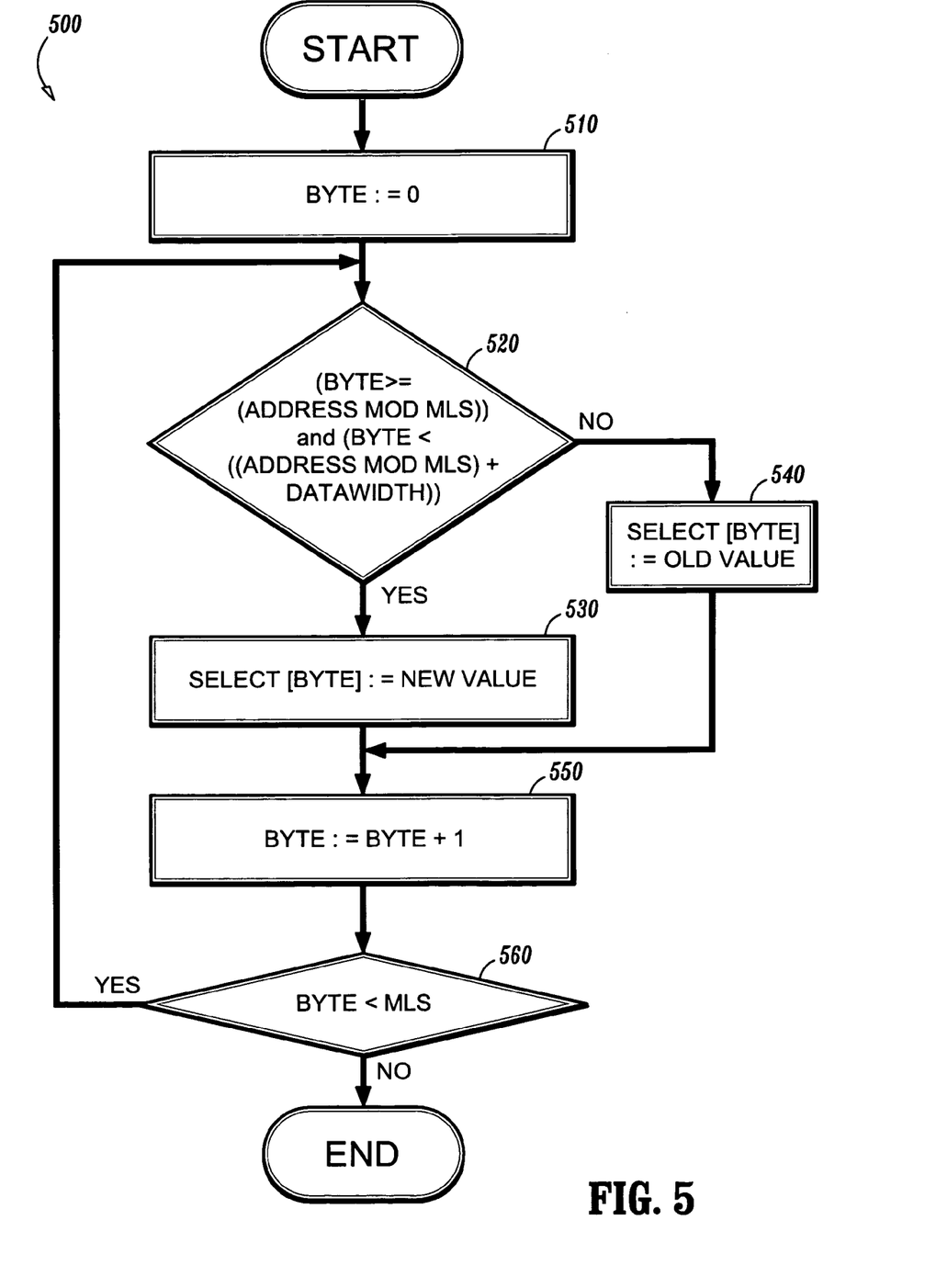
FIG. 5 is a flow diagram illustrating alignment network control logic used in conjunction with the memory write data path of FIG. 2, according to an illustrative embodiment of the present invention.

FIG. 5 is a flow diagram illustrating the alignment network control logic 500 used in conjunction with the memory write data path 200 of FIG. 2, according to an illustrative embodiment of the present invention. In particular, the alignment network control logic 500 is used to control multiplexers 220. As is apparent to those of ordinary skill in the related art, other control logic may also be present in the memory data path, e.g., cache hit/miss logic. The alignment network control logic 500 is expressed as a sequential loop to express the functionality of the alignment network control logic 500, although it is apparent to those of ordinary skill in the related art that actual implementations are usually performed using parallel control logic. In particular, when a store instruction is processed by the processor, the alignment network control logic 500 performs a loop for every byte of the memory line size (MLS), beginning with byte 0 (initialized in step 510) until the end of the memory line size (loop counter increment is performed in step 550 and loop iteration test in step 560).

In step 520, it is determined whether the current byte within a memory line is part of the memory word to be written at the specified store address. If not (negative determination at step 520), then processing proceeds to step 540. Otherwise, processing continues with step 530.

In step 530, the control signal for the current byte is selected such that the value provided by the memory write data path will be selected, and processing proceeds to step 550.

In step 540, the multiplexer is configured to maintain the previous value in the memory location, and processing proceeds to step 550.

The loop counter is incremented in step 550, and it is determined whether the current byte is less than the MLS (step 560). If so, then processing returns to step 520 to perform the next iteration. The loop iterates until control signals for the entire memory line have been generated. Thus, for a negative determination at step 560, the processing is terminated.

Figure 6:
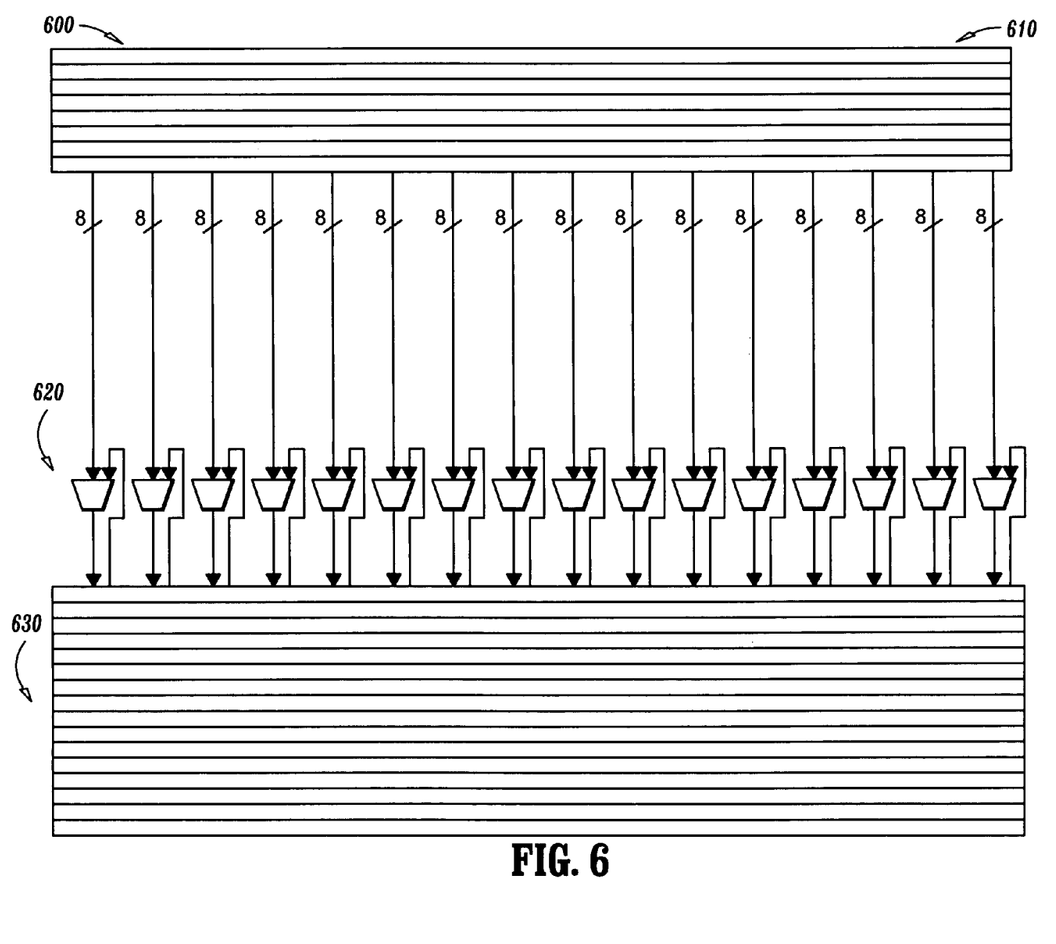
FIG. 6 is a block diagram illustrating an alignment network, according to an illustrative embodiment of the present invention.

FIG. 6 is a block diagram illustrating an alignment network 600, according to an illustrative embodiment of the present invention. The alignment network 600 is designed to further reduce design complexity. In particular, the alignment network 600 includes a wide register file 610 (e.g., corresponding to the width of the memory line size) connected to the memory write data path. The alignment network further includes multiplexers 620 and a cache memory 630. The alignment network 600 is to be used in conjunction with the alignment network control logic 500 of FIG. 5. By employing a wide register file, this embodiment simplifies the laying out of signals during the design process, and furthermore reduces fan-out of the signals directed at the memory write path implementation.

In FIG. 6, the memory line has been designated as a cache line, since most computer systems employ wide caches. However, as is readily apparent to one of ordinary skill in the related art, other memory structures could interface to the alignment network. Moreover, as is known to those of ordinary skill in the related art, a computer system can also include other logic, such as a read/write buffer, Error Correcting Code (ECC) or parity checking, and generation logic.

Comparing the instruction sequences to access memory in sub-word data widths, most current microprocessors are based on an alignment network as illustrated in FIG. 1 with control logic as illustrated in FIG. 3. Using such hardware mechanisms, a byte can, for example, be written to main memory with a single instruction such as the PowerPC instruction:

stb r4, 0(r5)

The preceding instruction is used to store the least significant byte contained in register r4 at the location specified by register r5. It should be noted that the execution of the store byte stb memory instruction implemented in common microprocessor architectures is complex and induces significant design complexity and cycle time penalty. In particular, all memory instructions need to be routed through an alignment network, to be properly aligned relative to a memory line, and then written into the memory line. Furthermore, the store address is checked for alignment on natural data item boundary during the execution of the stb instruction and, if misalignment is detected, then complex control logic to store unaligned data items is invoked. Storing unaligned data items may usually be accomplished by transferring control to either a state machine or to microcode contained in the processor.

Furthermore, this complexity and cycle time penalty impacts all memory store instructions, thus even when storing properly aligned data items (such as full width data items), the alignment network needs to be used. In addition, even store instructions storing to addresses known to be aligned on natural data item boundaries are usually checked for such alignment, incurring additional overhead penalties.

As in the previous example, the significant byte of the value to be stored is contained in the least significant byte of register r4 and the target address specified by 0(r5). Referring now to an architecture which does not support memory access at a smaller than word granularity (such as the DEC Alpha Architecture), in the prior art, storing a byte consists of sequences of loading the surrounding memory word, merging the byte with the memory word and storing back the merged word, e.g., using the following code:

| | |
|---|---|
| LDQ_U r3, 0 (r5) | ;; load preferred length data item (i.e., the full width item) surrounding the sub-width item |
| INSB r4, r5, r4 | ;; rotate the sub-width item into the appropriate slot of the full width item |
| MSBL r3=r3&~(255<<r5) | ;; clear the old data in the desired sub-width slot of the preferred length data item |
| OR r3, r3, r4 | ;; merge the correctly aligned sub-width item into the previously cleared slot |
| STQ_U r3, 0 (r5) | ;; store back full-width item |

We observe that significant effort is expended in loading, clearing and inserting data from/into a preferred data width item. Similar effort is expended when other variations and similar implementations of the preceding prior art instruction sequence are employed. The invention is equally applicable in overcoming the deficiencies of such other variations and implementations.

An implementation of the present invention that uses the alignment network of FIG. 2 in conjunction with the alignment network control logic 400 of FIG. 4 will now be described. According to the present invention, only the following steps are necessary: rotate the data of the sub-width item into the appropriate slot of the full width item; and store the data into the memory, using byte-wise write-enable functionality in the memory interface (e.g., a read-write buffer).

In one implementation according to the present invention, this sequence can be generated using two specialized instructions. In another implementation according to the present invention, the data rotation can be performed using general purpose instructions, for example, consisting of one instruction to compute the byte (or halfword, or word, etc.) slot within a full-data width register based on the alignment of the specified byte (or halfword, or word, etc.) address, and a second rotation instruction.

Figure 7:
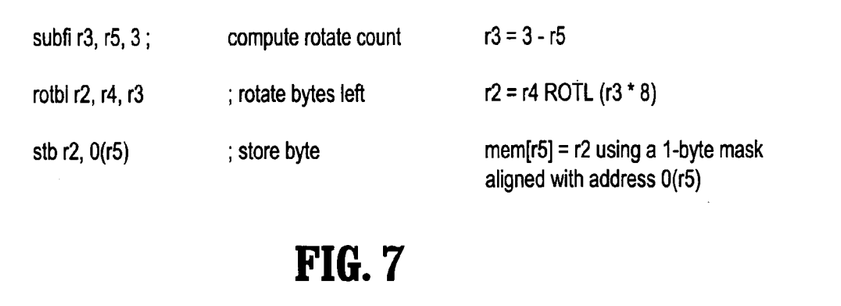
FIG. 7 is a diagram illustrating a 3-instruction store sequence, according to an illustrative embodiment of the present invention.

Consider the 3-instruction store sequence depicted in FIG. 7. FIG. 7 is a diagram illustrating a 3-instruction store sequence, according to an illustrative embodiment of the present invention.

Figure 8:
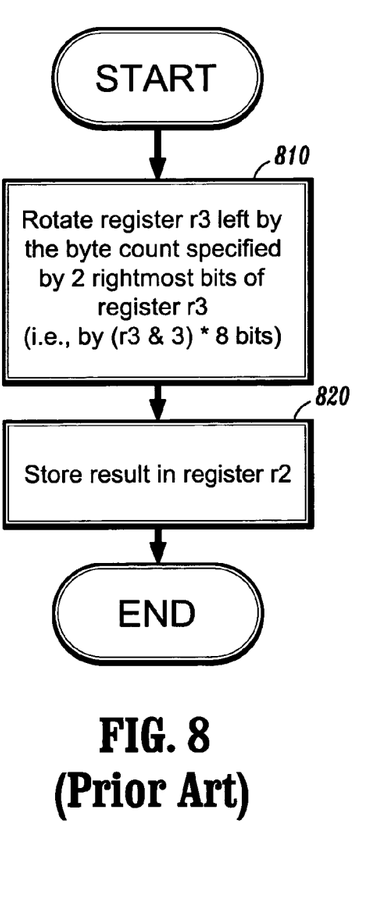
FIG. 8 is a flow diagram illustrating steps corresponding to a rotate bytes left (rotbl) instruction of FIG. 7, according to the prior art.

The functionality of the rotbl (rotate bytes left) instruction of FIG. 7 is depicted in FIG. 8. FIG. 8 is a flow diagram illustrating steps corresponding to the rotate bytes left (rotbl) instruction of FIG. 7, according to the prior art.

Register r3 is rotated to the left by the byte count specified by the 2 rightmost bits of register r3 (that is, by (r3 & 3)*8 bits) (step 810). The result is stored in register r2 (step 820).

Figure 9:
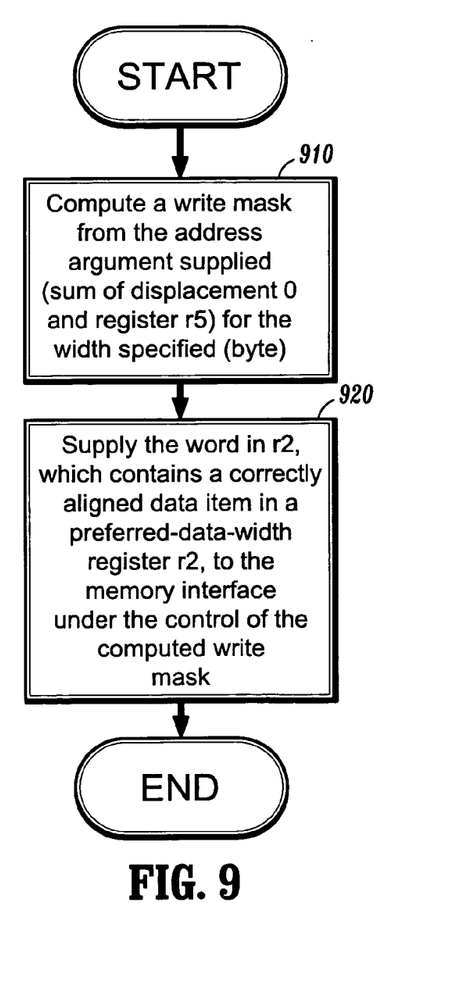
FIG. 9 is a flow diagram illustrating steps corresponding to a store byte (stb) instruction of FIG. 7, according to an illustrative embodiment of the present invention.

The functionality of the stb (store byte) instruction of FIG. 7 is depicted in FIG. 9. FIG. 9 is a flow diagram illustrating steps corresponding to the store byte (stb) instruction of FIG. 7, according to an illustrative embodiment of the present invention.

A write mask is computed from the address argument supplied (the sum of displacement 0 and register r5) according to the control logic of FIG. 5 (i.e., the address corresponding to a store instruction initially provided to store the data item) (step 910). For the purposes of the present invention, the terms "mask" and "write mask" refer to a control word that selects data bits, bytes, or words (or some other data type, as appropriate) from a collection of first and second (and optionally, third, fourth, etc.) data collections of bits, bytes, or words, selecting for each resultant bit, byte, or word (or other data type, as appropriate), a bit, byte, or word from either the respective value in the first or the second (and optionally, a third, fourth, etc.) data collections under control of the control word. The mask is formed based on the store datatype to facilitate the writing of a number of bits corresponding to the size of the data type. Thus, if the mask encodes bits, then the number of bits set in the mask will be set to the number bits in the data type in a common encoding of masks. In another encoding, a complemented mask may be used based on the ones-complement of the write mask. It is to be appreciated that the present invention is not limited to the preceding encodings and, thus, other encodings may be employed in accordance with the present invention while maintaining the spirit and scope thereof.

The word in r2, which contains a correctly aligned data item in a preferred-data-width register r2, is supplied to the memory interface for storage under the control of the computed write mask (step 920).

By combining instructions 1 and 2 into a single rotate instruction which computes the alignment similar to the INSB instruction, the same operation can be achieved with only two instructions.

The description and Figures have been presented based on atomic byte-granularity memory units. However, it will be readily apparent to one of ordinary skill in the related art that alignment and write signal selection can be performed at any other granularity level, both coarser and finer, such as bits, half-bytes, words, half-words, double-words, or any other unit.

Further, it will be readily apparent to one of ordinary skill in the related art that although the present invention has been described in terms of a big-endian memory layout, the present invention can be readily adapted for use in little-endian systems or in systems supporting big- and little-endian processing.

Moreover, it will be readily apparent to one of ordinary skill in the related art that the present invention is also applicable to a processor containing wide vector registers when processing 32-bit words. In particular, 32 bit words can be stored from a wide vector register embodiment as shown in FIG. 6 in conjunction with control logic as shown in FIG. 5 using an instruction sequence similar to that depicted in FIG. 10. The particular code sequence shown therein corresponds to storing a 32-bit word right-aligned within a wide vector register, e.g., in an architecture supporting a preferred slot for processing scalar data in its rightmost vector element. The "preferred slot" is described in a U.S. patent application Ser. No. 09/929,805 entitled "Processor Implementation Having Unified Scalar and SIMD Datapass, filed on Aug. 14, 2001, the disclosure of which is commonly assigned and incorporated by reference herein.

Figure 10:
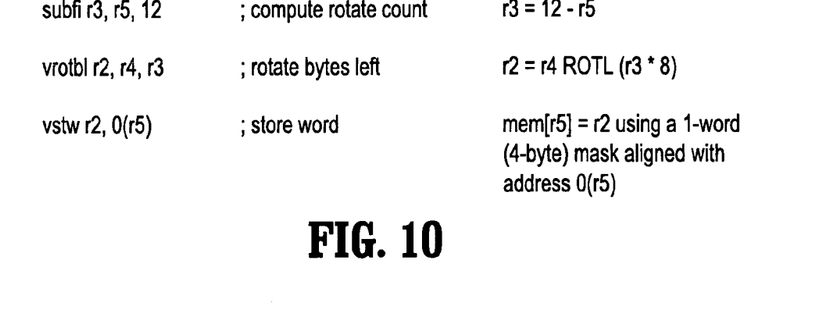
FIG. 10 is a diagram illustrating an instruction sequence for storing 32 bit words from a wide vector register embodiment as shown in FIG. 6 in conjunction with control logic as shown in FIG. 5, according to an illustrative embodiment of the present invention.
Figure 11:
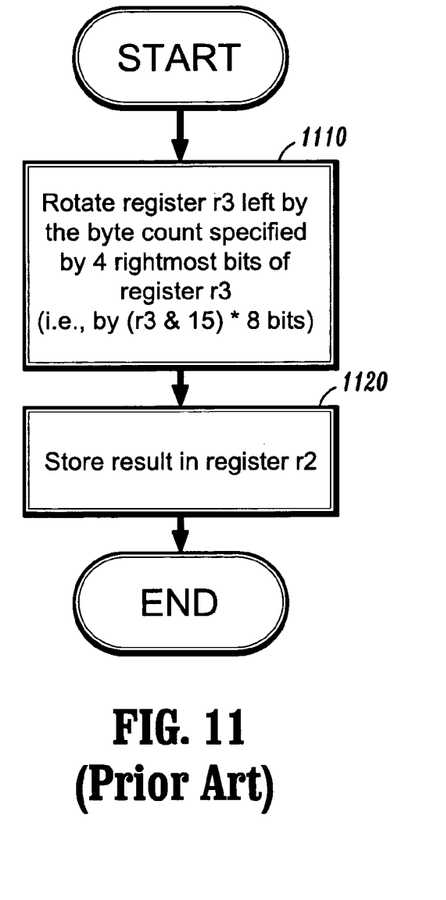
FIG. 11 is a flow diagram illustrating steps corresponding to a rotate bytes left (vrotbl) instruction of FIG. 10, according to the prior art.

The functionality of the vrotbl (rotate bytes left) operation of FIG. 10 is depicted in FIG. 11. FIG. 11 is a flow diagram illustrating steps corresponding to the rotate bytes left (vrotbl) instruction of FIG. 10, according to the prior art. Register r3 is rotated to the left by the byte count specified by the 4 rightmost bits of register r3 (that is, by (r3 & 15)*8 bits) (step 1110). The result is stored in register r2 (step 1120).

Figure 12:
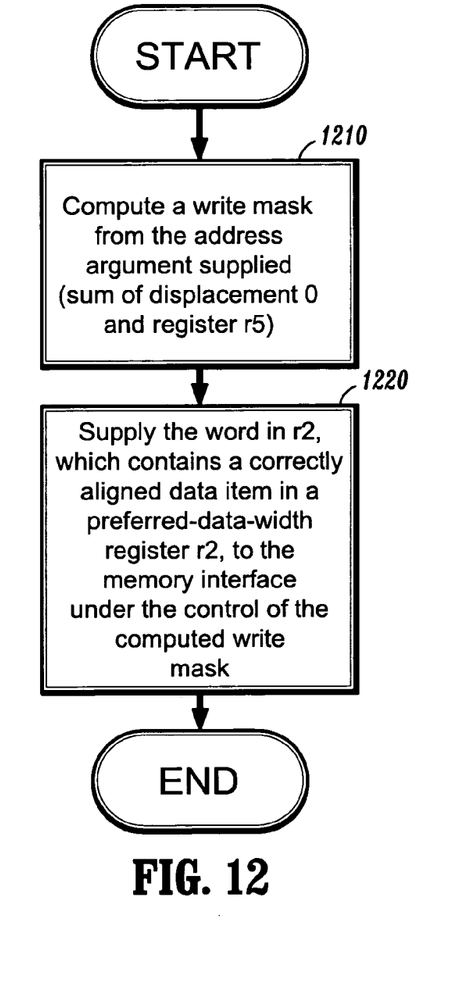
FIG. 12 is a flow diagram illustrating steps corresponding to a store word (vstw) instruction of FIG. 10, according to an illustrative embodiment of the present invention.

The functionality of the vstw (store word) operation of FIG. 10 is depicted in FIG. 12. FIG. 12 is a flow diagram illustrating steps corresponding to the store word (vstw) instruction of FIG. 10, according to an illustrative embodiment of the present invention.

A write mask is computed from the address argument supplied (the sum of displacement 0 and register r5) according to the control logic of FIG. 5 (i.e., the address corresponding to a store instruction initially provided to store the data item) (step 1210). The word in r2, which contains a correctly aligned word in a preferred-data-width register r2, is supplied to the memory interface for storage under the control of the computed write mask (step 1220).

It is to be appreciated that the present invention can be used in conjunction with a number of implementation techniques for implementing systems which can access both little and big endian data. Such techniques can be exploited by adding hardware capabilities or (preferably) appropriate software instructions to the code sequence to perform techniques familiar to those of ordinary skill in related art (e.g., "bit swizzling") in conjunction with the teachings of the present invention.

A sample implementation sequence of bit swizzling used to perform a little-endian store byte operation (for a word-oriented architecture) is as follows, based on FIG. 7 in conjunction with a first bit swizzling step. As in previous examples, the value to stored is contained within the least significant byte of register r4, and the memory store address is 0(r5):

| | |
|---|---|
| xori r1, r5, 3 | ; swizzle r5 into r1 |
| subfi r3, r1, 3 | ; compute alignment position |
| rotbl r2, r4, r3 | ; alignment operation |
| stb r2, 0 (r1) | ; perform store using mask |

The apparatus and methods disclosed herein can be used in conjunction with a number of implementation techniques for implementing systems which can access unaligned data. In particular, this can be achieved with specialized store instructions which perform a store operation under the control of a mask which selects the bits in a first or a second half of an unaligned word, the first half consisting of those data elements to be stored at an address below an alignment boundary, the second half to be stored at an address above an alignment boundary.

A sample implementation sequence of unaligned store access is provided here based on FIG. 10:

| | |
|---|---|
| subfi r3, r5, 12 | ; compute rotate count |
| vrotbl r2, r4, r3 | ; rotate to alignment |
| vstwl r2, 0 (r5) | ; store lower half of word starting at 0 (r5) up to next natural alignment boundary |
| vstwu r2, 0 (r5); | ; store upper half of word starting at alignment boundary to end of word |

When an aligned data item is stored by the instruction sequence directed towards support for storing unaligned data items, at least one of the vstwl and vstwu can be a no-op. As is known, a no-op is an instruction which does nothing. The alignment boundary can be word size, wide word size, memory line size, cache line size, or a similar natural architectural boundary. In this exemplary implementation, the vstwu instruction adjusts the address base to address the second memory portion automatically. In another implementation, this may have to be done explicitly, e.g., using an instruction such as vstwu r2, 16(r5) in the case of a 16-byte alignment boundary. Given the teachings of the present invention provided herein, one of ordinary skill in the related art will contemplate these and various other implementations and variations of the present invention, while maintaining the spirit and scope of the present invention.

Although the illustrative embodiments have been described herein with reference to the accompanying drawings, it is to be understood that the present system and method is not limited to those precise embodiments, and that various other changes and modifications may be affected therein by one skilled in the art without departing from the scope or spirit of the invention. All such changes and modifications are intended to be included within the scope of the invention as defined by the appended claims.

What is claimed is:

1. A method for aligning and inserting data elements into a first memory based upon an instruction sequence consisting of one or more alignment instructions and a single store instruction, comprising the steps of:
    given a data item that includes a data element to be stored, aligning the data element in a second memory with respect to a predetermined position in the first memory, in response to the one or more alignment instructions;
    dynamically generating a mask to enable writing of memory bit lines that correspond to the aligned data element; and
    writing the memory bit lines to the first memory under a control of the mask, wherein said generating and writing steps are performed in response to the single store instruction, wherein the method is performed without merging.

2. The method of claim 1, wherein the second memory is a register.

3. The method of claim 1, further comprising the step of computing the mask from an address argument corresponding to the single store instruction.

4. The method of claim 3, wherein the address argument comprises a displacement value and an address value.

5. The method of claim 4, wherein the address value specifies a particular register.

6. The method of claim 1, further comprising the step of computing the mask based upon a data type of the data element.

7. The method of claim 1, wherein the predetermined position in the first memory corresponds to a target position within a memory line.

8. The method of claim 1, further comprising the step of computing and checking parity information corresponding to the data element.

9. The method of claim 1, further comprising the step of computing and checking error correction code (ECC) information corresponding to the data element.

10. The method of claim 1, further comprising the step of intermediately storing the memory bit lines from the second memory to a read-write buffer before said writing step.

11. A system for aligning and inserting data elements into a first memory in response to an instruction sequence consisting of one or more alignment instructions and a single store instruction, comprising:
    means for receiving a data item that includes a data element to be stored;
    means for aligning the data element in a second memory with respect to a predetermined position in the first memory, in response to the one or more alignment instructions;
    means for dynamically generating a mask to enable writing of memory bit lines that correspond to the aligned data element, in response to the single store instruction; and
    means for writing the memory bit lines to the first memory under a control of the mask, in response to the single store instruction, wherein the system aligns and inserts data elements into the memory without merging.

12. The system of claim 11, wherein said system exploits partial line write capabilities of the first memory.

13. The system of claim 11, further comprising logic for computing and checking parity information corresponding to the data element.

14. The system of claim 11, further comprising logic for computing and checking error correction code (ECC) information corresponding to the data element.

15. The system of claim 11, further comprising:
    a CPU;
    a read-write buffer for intermediately storing, under a control of the CPU, the memory bit lines from the second memory before said writing step.

16. The system of claim 11, wherein the first memory comprises a cache, and said means for writing writes the data element to the cache under the control of the mask.

17. The system of claim 11, wherein the data item is a data word.

18. A method for storing data in a memory based upon an instruction sequence consisting of one or more alignment instructions and a single store instruction, comprising the steps of:
    aligning the data in a register relative to a location of the data within a target memory address line, in response to the one or more alignment instructions; and
    storing a portion of the aligned data within the memory under a control of data type information and an address argument specified by the single store instruction, in response to the single store instruction, wherein the method is performed without merging.

19. The method of claim 18, wherein said storing step stores the portion of the aligned data under the control of a write mask computed from the data type information and the address specified by the single store instruction.

20. The method of claim 18, further comprising the step of intermediately storing the aligned data from the register to a read-write buffer before said storing step.

21. The method of claim 18, wherein the address argument comprises a displacement value and an address value.

22. The method of claim 21, wherein the address value specifies a particular register.

* * * * *